Jan. 16, 1934.  B. W. DENNIS  1,944,135

GASKET

Original Filed April 9, 1928

Inventor
B. W. Dennis
By W. S. McDowell.
Attorney

Patented Jan. 16, 1934

1,944,135

UNITED STATES PATENT OFFICE 1,944,135

GASKET

Basil W. Dennis, Columbus, Ohio, assignor to General Fire Extinguisher Company, Providence, R. I., a corporation of Delaware Application April 9, 1928, Serial No. 268,528
Renewed December 24, 1931

11 Claims. (Cl. 285—90)

This invention relates to gaskets of the type employed in pipe flange connections, and the principal object of the invention resides in the provision of a metallic gasket formed to include separable sections, wherein said sections are normally pressed apart by resilient means, so that the opposed surfaces of said sections may closely engage with the complemental faces of a pair of spaced pipe flanges for the purpose of producing a gasket or seal between said flanges which will prevent the uncontrolled escape of a fluid circulating through the co-operative pipes or conduits.

Another object of the invention resides in gasket of the character aforesaid which is particularly applicable in uniting relatively large conduits or pipe sections such, for example, as the type employed in the steam admission and exhaust lines of turbines, compressors, condensers, pumps, steam engines and other similar driving and driven apparatus to and from which fluids under various pressures are passed. Many pipe lines of this character include flanged couplings which must be rendered fluid tight, and the present invention provides a self-contained resilient structure which operates through spring pressure to close the adjoining surfaces of such pipe couplings to the undue escape or seepage of the fluid passing therethrough.

A further object rests in the provision of a self-centering, resilient gasket which constitutes an effective seal to prevent the escape of a fluid through the coupling joints of a pair of adjacent pipe sections and furthermore provides for such effective sealing under all conditions of operation of the pipe sections, irrespective of changes in the relative alignment of said sections, due to expansion or contraction thereof or to forces which tend to displace the sections laterally.

Figure 1:
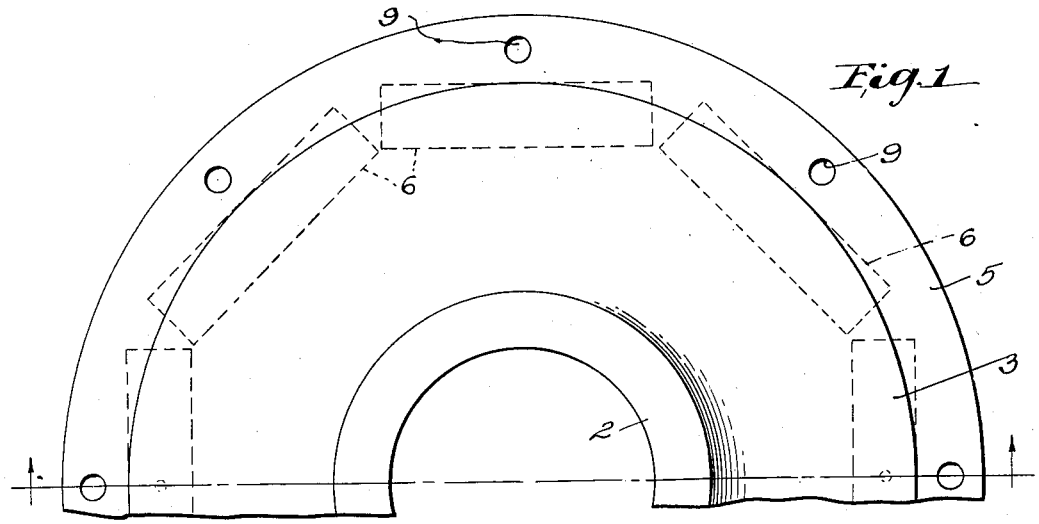
Figure 2:
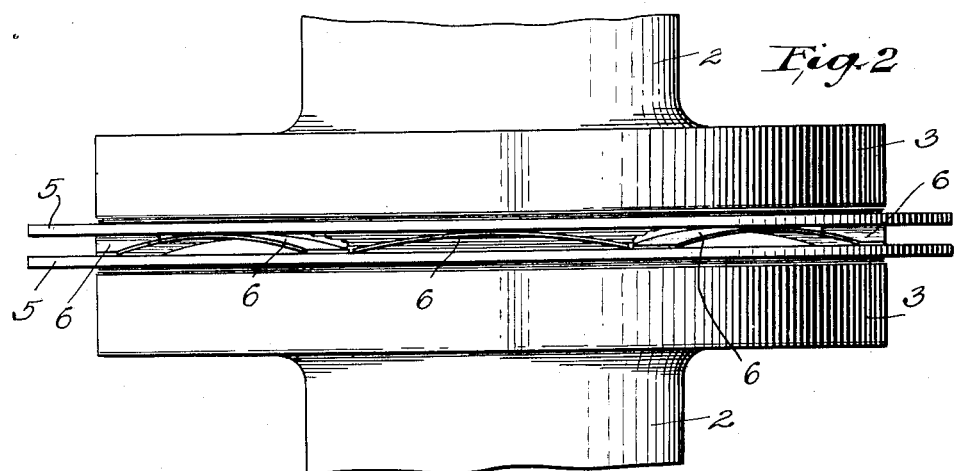
Figure 3:
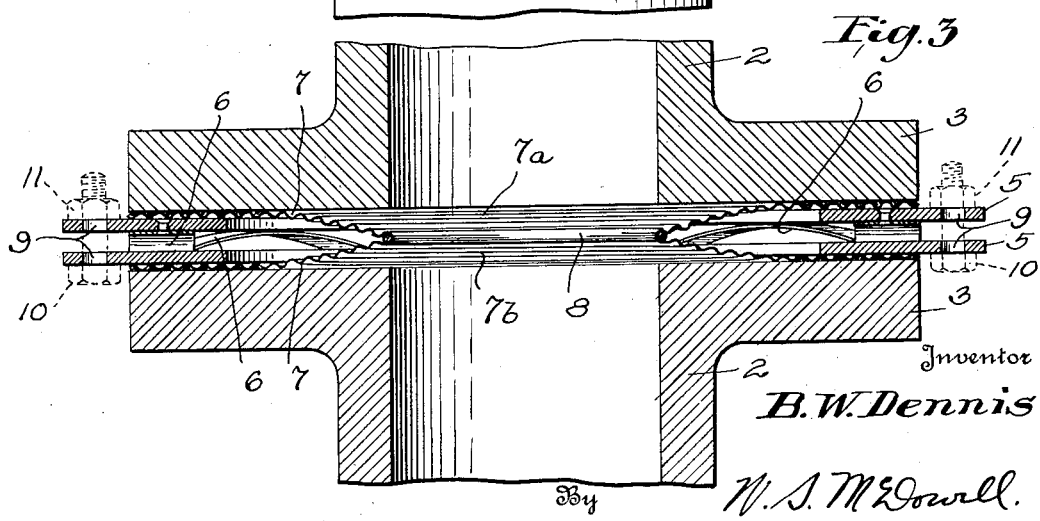

For a further understanding of the invention reference is to be had to the following description and the accompanying drawing, wherein:

Figure 1 is a top plan view of a pipe coupling provided with the gasket structure comprising the present invention, Figure 2 is a side elevation of the coupling and gasket structure, Figure 3 is a vertical sectional view taken through said structure on the plane indicated by the line 3—3 of Figure 1.

Referring more particularly to the drawing the numeral 1 designates a pipe coupling which is formed to include, as usual, a pair of aligned pipes or conduits 2—2, which terminate adjacent to one another in enlarged annular flanges 3—3, the opposed faces of which being of planar form so as to receive between them the gasket structure 4 which comprises the present invention.

The gasket structure includes a pair of rings 5—5, which are of greater diameter than the flanges 3 so that when the rings are operably positioned the perimeter thereof project beyond the circumferential portion of the flanges 3. Connected with one of the rings 5 is a plurality of bowed leaf springs 6, the outer ends of which engage with the other of said rings so that the normal tendency of said springs will be to separate or to force apart the rings.

Connected with the rings 5 in any suitable manner and disposed between the opposed faces of the flanges 3 is a corrugated, sheet-metal section 7 which may be formed from a substantially flexible material such as copper or other relatively soft metal. The section 7 includes upper and lower portions 7a and 7b which are united at their inner portions and are there reinforced by an annular loop 8. If desired, where the portions 7a and 7b engage with the opposed faces of the flanges 3, the section 7 may be provided with compressible material such as lead or packing so as to more effectively seal the joints between the opposing faces of the coupling.

In operation, when the conduits 2—2 are separated and occupy relatively fixed positions, I place into the registering openings 9 of the rings 5 bolts 10 which receive nuts 11. By tightening these nuts and rings 5—5 are drawn together against the resistance offered by the spring 6. When the rings have been compressed sufficiently so that the gasket structure as a whole may be inserted between the opposed faces of the coupling, as shown in Figure 3, the nuts 11 are loosened and the bolts 10 removed from the openings 9. The rings 5—5 are then permitted to slide apart under the influence of the spring 6 so that the corrugated section 7, which is of a flexible material, may be forced into firm sitting engagement with the opposite faces of the flanges 3. The pressure exerted by the plurality of springs 6, which are arranged as shown in Figures 1 and 2, causes the section 7 to tightly seal the joints between the conduits 2—2, thereby permitting of fluid flow under pressure from one of the conduits to the other without loss or seepage through the joints of the flange connection. Moreover, the gasket structure automatically adapts itself to expansion and contraction or slide misalignment on the part of the conduits 2 and possesses other advantages over the customary rigid type of coupling.

What is claimed is:

1. The combination with a pair of substantially aligned conduits having communicating flange portions spaced apart, of means for providing a fluid tight seal for the space between the flanged end portions of said conduits, said sealing means including a gasket having flexible walls, and spring means arranged between said walls for applying pressure to said gaskets to cause parts of the surfaces thereof to positively and forcibly engage portions of each of said conduits in a fluid tight manner while permitting substantial movements of mutual approach and recession both laterally and axially of the meeting portions of said conduits.

2. In apparatus of the character described, in combination, a pair of conduit units formed to include flanged meeting portions, said conduit being supported so that the latter are free to approach and recede from each other longitudinally to a substantial degree, a sealing joint between said conduit units, comprising a flexible gasket having opposed walls united at their inner portion formed from pliable material and arranged to engage with the flanged surfaces of said conduits to close the space between said conduits, a pair of rings arranged within said gaskets and spring means serving normally to maintain said rings in spaced relationship.

3. In apparatus of the character described, in combination, a pair of adjoining conduits adapted for the transmission of a fluid under pressure, said conduits being provided with flanged ends, a self-sealing gasket interposed between the flanged ends of said conduits to prevent the escape of the fluid between the joints of the conduits, irrespectively of changes in positions of said conduits due to expansion and contraction or lateral displacement thereof, said gasket comprising a corrugated wall of a pliable material folded upon itself to provide opposed sides, a pair of rings confined between the opposite sides of said corrugated wall, and springs seated between said rings and normally tending to force the latter apart, whereby said rings press upon said corrugated material to hold the latter in sealing engagement with the flanged ends of said conduits.

4. In apparatus of the character described, in combination, a pair of fluid conveying conduits having flanged meeting ends, said ends being normally spaced apart, a gasket for sealing the space between said ends, said gasket being formed to include a flexible wall folded upon itself so that the opposite sides of said wall engage with the flanged ends of said conduits, a pair of rings seated between said walls, and a plurality of springs interposed between said rings and operating to spread the latter apart so as to maintain the flexible walls of the gasket in firm seating engagement with the flanged ends of said conduits, said rings being of greater diameter than the flanged ends of said conduits to provide protruding actuating portions by means of which said gasket may be collapsed.

5. A gasket adapted to be positioned between a pair of opposed surfaces to form a fluid-tight joint therebetween comprising flexible walls united along one of their edges and having their separated portions engaging said surfaces, spring means positioned between said walls for applying pressures thereto in an outward direction against said surfaces, and means for rendering said spring means inactive during the positioning of said gasket between said surfaces.

6. As a new article of manufacture, a gasket made of a plurality of flexible walls united along one of their edge portions and having their opposite edge portions disposed in a separate relationship, spring means arranged between said separating portions for exerting an outward force upon said walls, and means for maintaining said spring means in an applied position between said walls.

7. As a new article of manufacture, a gasket formed of two flexible metallic walls united at one of their edges in a fluid-tight manner and having the remaining portions of said walls arranged in spaced order, said spaced wall portions being adapted for engagement with the meeting ends of a pair of conduit sections, resilient means interposed between said walls for applying pressures thereon in an outward direction against said conduit sections, and compressible material arranged between the conduit ends and said wall portions for effecting a seal therebetween upon the expansion of said resilient means.

8. As a new article of manufacture, a gasket made of a flexible member including a pair of wall portions having their separated edges adapted for engagement with a pair of adjacent conduit ends, a plurality of spring members positioned between said wall portions, for exerting outward pressure thereon, and a ring like member attached to said springs for maintaining the same in operative positions.

9. As a new article of manufacture, a gasket formed of a plurality of flexible walls united along one of their edge portions and having their opposite edge portions disposed in separate relationship and adapted for engagement with a pair of adjacent conduit ends, and a plurality of independently bowed leaf springs arranged between said walls for exerting outward pressure thereon.

10. As a new article of manufacture, a gasket made of a flexible member including a pair of wall portions united along one of their edges and having their opposite edges in engagement with a pair of adjacent conduit ends, spring means in connection with said wall portion for exerting outward pressure thereon into contact with said conduit ends, and means for rendering said spring means inactive during the positioning of said gasket between said conduit ends.

11. A gasket adapted to be positioned between a pair of adjacent conduit ends to form a fluid tight joint therebetween, said gaskets comprising flexible walls united along one of their edges and having their separated edges engaging said conduit ends, spring means in connection with said walls for exerting outward pressure thereon into engagement with said conduit ends, said spring means being accessible from the exterior of said gasket and capable of being made inactive during the positioning of said gaskets between said conduit ends.

BASIL W. DENNIS.